United States Patent
Fernandez et al.

(10) Patent No.: US 9,245,542 B1
(45) Date of Patent: Jan. 26, 2016

(54) MEDIA CLEANING WITH SELF-ASSEMBLED MONOLAYER MATERIAL

(71) Applicant: Seagate Technology LLC, Cupertino, CA (US)

(72) Inventors: Robert Anthony Fernandez, Bloomington, MN (US); Paul Macarius Olsen, San Francisco, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/811,031

(22) Filed: Jul. 28, 2015

(51) Int. Cl.
 *G11B 5/11* (2006.01)
 *G11B 5/127* (2006.01)

(52) U.S. Cl.
 CPC . *G11B 5/11* (2013.01); *G11B 5/127* (2013.01)

(58) Field of Classification Search
 CPC ................... G11B 5/127; G11B 5/11
 USPC ..................... 360/235.1–235.9, 128
 See application file for complete search history.

(56) References Cited

U.S. PATENT DOCUMENTS

| | | | |
|---|---|---|---|
| 4,762,534 A | 8/1988 | Ito et al. | |
| 4,983,421 A | 1/1991 | Mochizuki et al. | |
| 5,307,593 A | 5/1994 | Lucker et al. | |
| 5,695,386 A | 12/1997 | Ryoke et al. | |
| 2009/0297868 A1* | 12/2009 | Ito ....................... | H01L 51/0533 428/447 |
| 2010/0068798 A1* | 3/2010 | Solomon ................ | A61B 5/145 435/287.2 |
| 2011/0053479 A1 | 3/2011 | Kim et al. | |
| 2014/0193185 A1* | 7/2014 | Kami ................. | G03G 21/0035 399/346 |
| 2014/0247519 A1* | 9/2014 | Takizawa ................. | G11B 5/72 360/110 |
| 2014/0377143 A1* | 12/2014 | Ellison ................. | G11B 25/043 422/222 |
| 2015/0179216 A1* | 6/2015 | Engelkes ............. | G11B 23/505 360/235.4 |

* cited by examiner

*Primary Examiner* — Allen T Cao
(74) *Attorney, Agent, or Firm* — HolzerIPLaw, PC

(57) ABSTRACT

A method of cleaning a recording medium, such as a disc. The method includes contacting a surface of the recording medium with a cleaning tape comprising a flexible backing and a self-assembled monolayer (SAM) coating. The cleaning tape may include an abrasive coating, with the SAM on the abrasive coating.

16 Claims, 7 Drawing Sheets

MEDIA CLEANING WITH SELF-ASSEMBLED MONOLAYER MATERIAL

BACKGROUND

Hard disc drives are common information storage devices having a series of rotatable discs that are accessed by magnetic reading and writing elements. These data elements, commonly known as transducers, or merely as a transducer, are typically carried by and embedded in a slider that is held in a close relative position over discrete data tracks formed on a disc to permit a read or write operation to be carried out.

As distances between the slider and the disc decrease, due to the ever-growing desire to reduce the size of the disc drive and to pack more data per square inch, the potentially negative impact due to contamination on the slider, disc, or other disc drive component increases. Unwanted contaminants anywhere in the disc drive can adversely affect fly height behavior, such as with elevated or decreased fly height, create fly asymmetry in roll or pitch character, produce excessive modulation, and even result in head-disc crashing or contact.

What is needed is a better mechanism to remove contaminants from the disc surface.

SUMMARY

Generally, the methods of this disclosure are directed to cleaning the storage medium, such as a disc, prior to incorporation into a storage assembly.

One particular implementation described herein is a method for cleaning a recording medium. The method includes contacting a surface of the recording medium with a cleaning tape comprising a flexible backing and a self-assembled monolayer (SAM) coating. The cleaning tape may include an abrasive coating, with the SAM on the abrasive coating.

Another particular implementation is an article for cleaning recording medium. The article comprises an elongate flexible backing comprising a self-assembled monolayer (SAM) thereon. The article may further include an abrasive coating, with the SAM on the abrasive coating.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

As discussed above, hard disc drive assemblies include a slider that is designed and configured to glide on an air bearing over a magnetic data storage disc. Contaminants, on the slider, on the disc, or elsewhere in the disc drive assembly, can interfere with the proper performance of either or both the "read" operation and the "write" operation of the disc drive. To reduce the potential for contaminants on the slider, a self-assembled monolayer (SAM) coating is applied to the air-bearing surface of the slider, which is the face of the slider that opposes the disc, before the slider is assembled into the disc drive. Because of the size of the slider and the SAM coating (deposition) process, other surfaces of the slider also become coated with the SAM coating. A SAM coating on certain surfaces is undesired for various reasons, thus it is desired to remove this SAM coating from these surfaces.

This disclosure is directed to methods of removing organic materials, but particularly SAM materials, from surfaces, such as the back pad of the slider.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
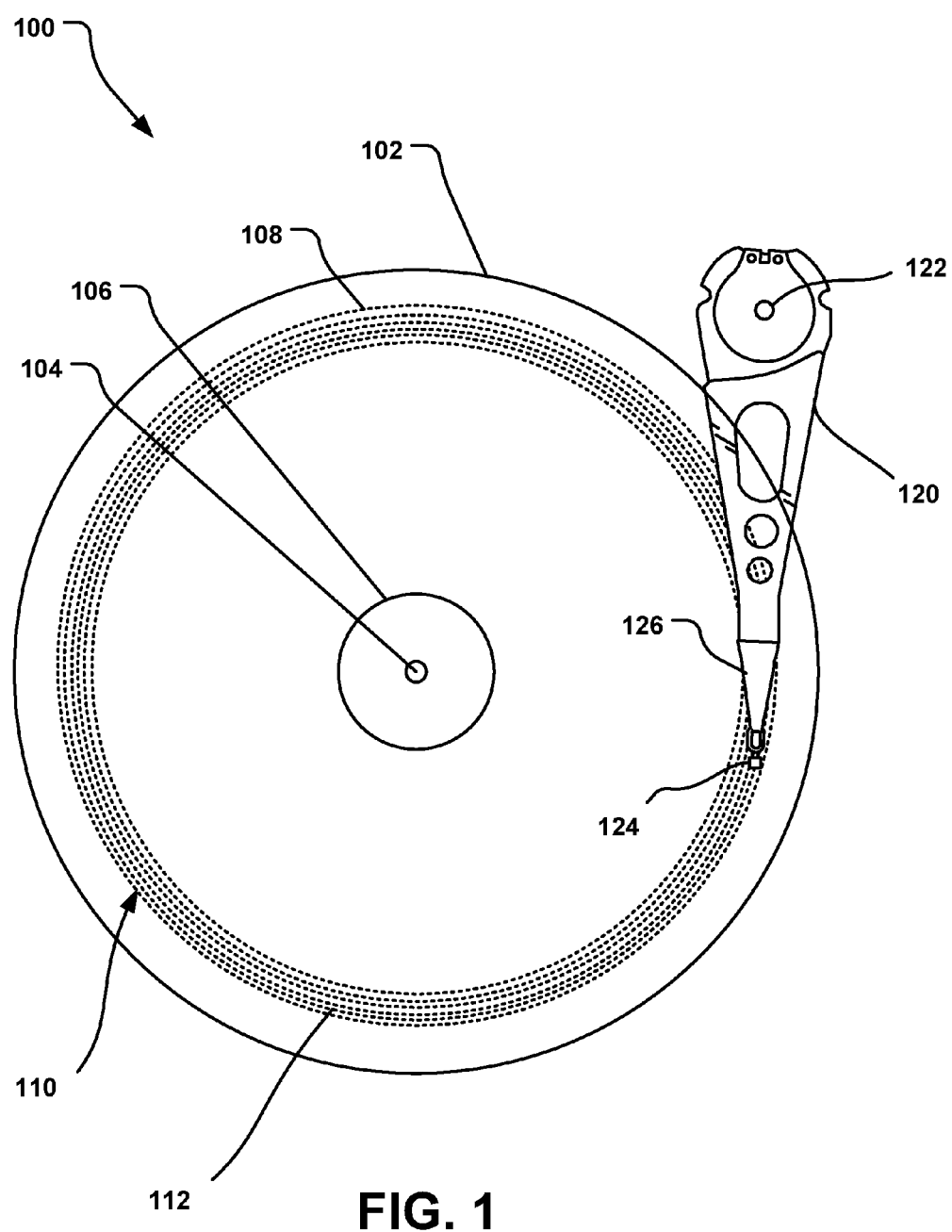
FIG. 1 is a schematic partial top view, partial perspective view of a disc drive assembly.

FIG. 1 illustrates a perspective view of an example storage assembly, or, disc drive assembly 100. Disc drive assembly 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced bits 112, indicated as dots on the disc 102. It should be understood, however, that the described technology may be employed with other types of storage media, including continuous magnetic media, discrete track (DT) media, etc.

Information may be written to and read from the bits 112 on the disc 102 in different data tracks 110. An actuator assembly 120 having an actuator axis of rotation 122 supports a slider 124 with a transducer in close proximity above the surface of the disc 102 during disc operation; not seen in FIG. 1, the slider 124 is connected to the actuator assembly 120 by a head-gimbal-assembly (HGA) 126. The surface of the slider 124 closest to and opposite to the disc 102 is called the air-bearing surface (ABS). In use, the actuator assembly 120 rotates during a seek operation about the actuator axis of rotation 122 to position the slider 124 over a target data track of the data tracks 110. As the disc 102 spins, a layer of air forms between the slider 124 and the surface of the disc 102, resulting in the slider 124 'flying' above the disc 102. The transducer on the slider 124 then reads or writes data to the bits 112 in the target data track 110.

Not shown in FIG. 1, the disc 102, actuator assembly 120 and all other features of FIG. 1 are retained in a housing or case. Prior to incorporating the disc 102 into the disc drive assembly 100, the disc 102 is cleaned of particulate and other contaminants by a flexible tape having a self-assembled monolayer (SAM) material thereon. This cleaning may be concurrent with, e.g., a burnishing process or servo track writing, and may be done before or after any protective coating or lubricant is placed on the disc 102.

Figure 2:
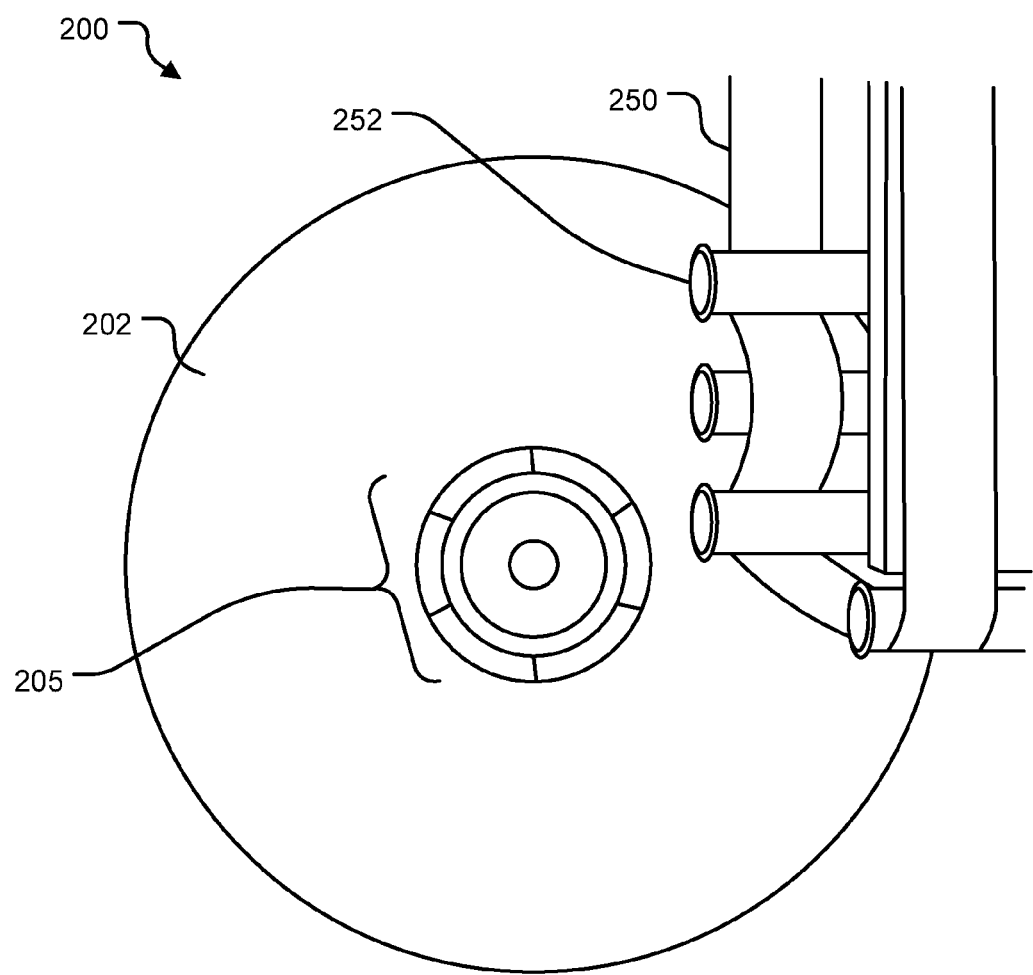
FIG. 2 is a schematic front plan view of a disc being cleaned.
Figure 3:
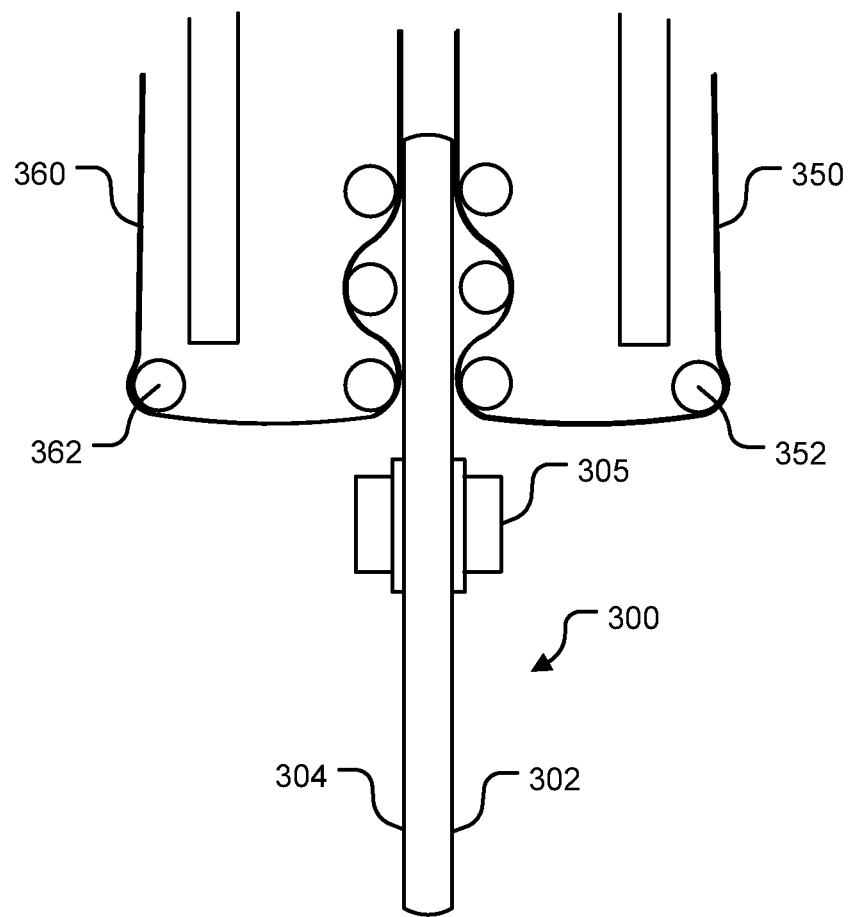
FIG. 3 is a schematic side plan view of a disc being cleaned.

FIGS. 2 and 3 illustrate two exemplary implementations of cleaning a medium with a flexible tape having a SAM material thereon. The cleaning removes particulates and other contaminants that may be present on the medium from the manufacturing process and/or the cleanroom environment. Additionally, the cleaning process smooths the medium surface, reducing asperities and high points.

In FIG. 2, a medium 200 (e.g., a magnetic disc) has a surface 202 configured for receiving and storing data when incorporated into an assembly, such as a disc drive assembly. The medium 200 is mounted on a central spindle 205, around which the medium 200 rotates; the rotation may be continuous or may be indexed.

A flexible tape 250, supported by a roller 252, is brought into contact with the surface 202; the tape 250 may be moving continuously or may be indexed. The tape 250 is sufficiently flexible to contour around the roller 252 (e.g., having a radius of about 2.5 mm) without distorting, wrinkling, cracking, or tearing. The tape 250 includes a SAM material thereon. When the surface 202 is contacted by the tape 250, any contaminants on the surface 202 migrate to and are collected on tape 250.

In FIG. 3, a medium 300 (e.g., a magnetic disc) has a first surface 302 and an opposite second surface 304, each configured for receiving and storing data when incorporated into an assembly, such as a disc drive assembly. The medium 300 is mounted on a central spindle 305, around which the medium 300 rotates; the rotation may be continuous or may be indexed.

A first flexible tape 350, supported by and fed through various rollers 352, is brought into contact with the first surface 302; the tape 350 may be moving continuously or may be indexed. Similarly, a second flexible tape 360, supported by and fed through various rollers 362, is brought into contact with the second surface 304; the tape 360 may be moving continuously or may be indexed. In some implementations, a backup pad or shoe across which the tape 350, 360 passes may be used instead of or in addition to the rollers 352, 362. The tapes 350, 360 are sufficiently flexible to contour around the rollers 352, 362 (e.g., having a radius of about 2.5 mm) and any other fixture without distorting, wrinkling, cracking, or tearing. The tapes 350, 360 include a SAM material thereon. When the surface 302 is contacted by the tape 350 and/or the surface 304 is contacted by the tape 360, contaminants on the surface 302, 304 migrate to and are collected on tape 350, 360, respectively.

Examples of contaminants possibly present on the media 200, 300 prior to cleaning are particulate (physical) contaminants that include magnetic sputter particles, carbon flakes, dust and other loose surface particles, particles generated from damage to the tape, and chemical contaminants that include organic stains and smears. The SAM material on the tape 250, 350, 360 is selected based on the expected contaminant(s).

Any SAM material or materials can be applied to the tape 250, 350, 360, and can be high surface energy material(s), low surface energy material(s), or a pattern having both. High surface energy SAM materials are particularly conducive to attract and retain particulate contaminants commonly found on magnetic media. The material can be oleophobic or oleophilic, hydrophobic or hydrophilic.

The term "low surface energy" and variations thereof, as used herein, refers to the tendency of a surface to resist wetting (high contact angle) or adsorption by other unwanted materials or solutions. In a low surface energy SAM, the functional terminal groups of the molecules are chosen to result in weak physical forces (e.g., Van der Waals forces) between the coating and contaminant. A low surface energy SAM allows for partial wetting or no wetting of the resulting SAM coating (i.e., a high contact angle between a liquid and the coating). Conversely, "high surface energy" refers to the tendency of a surface to increase or promote wetting (low contact angle) or adsorption of the surface of contaminants. In a high surface energy SAM, the functional terminal groups of molecules are chosen to result in a stronger molecular force between the coating and contaminant. If both a high surface energy material and a low surface energy material are present, the surface energies are relative. Values that are typically representative of "low surface energy" are in the range of 5-30 dyne/cm and high surface energy materials are relatively higher than this range, typically anything greater than 30 dyne/cm.

The phrase "oleophilic SAM" and variations thereof as used herein refers to a SAM having an oleophilic functional end group, such as saturated hydrocarbons. Other particular examples of suitable terminal groups include alkyls with 1-18 carbon atoms in addition to other unsaturated hydrocarbon variants, such as, aryl, aralkyl, alkenyl, and alkenyl-aryl. Additionally, materials with amine terminations, as well as carbon oxygen functional groups such as ketones and alcohols, will exhibit oleophilic properties.

The phrase "oleophobic SAM" and variations thereof as used herein refers to a SAM having an oleophobic functional end group, such as halosilanes and alkylsilanes. Particular examples of suitable halosilane and alkylsilane terminal groups include fluorinated and perfluorinated. In some implementations, an oleophobic SAM is also hydrophobic, thus being amphiphobic.

The precursor compound for forming a SAM coating contains molecules having a head group and a tail with a functional end group. Common head groups include thiols, silanes with hydrolizable reactive groups (e.g., halides: {F, Cl, Br, I}, and alkoxys: {methoxy, ethoxy, propoxy}, phosphonates, etc. Common tail groups include alkyls with 1-18 carbon atoms in addition to other unsaturated hydrocarbon variants, such as, aryl, aralkyl, alkenyl, and alkenyl-aryl. In addition, the hydrocarbons materials listed above can be functionalized with fluorine substitutions, amine terminations, as well as carbon oxygen functional groups such as ketones and alcohols, etc., depending on the desired properties of the resulting SAM coating. SAMs are created by chemisorption of the head groups onto the surface from either a vapor or liquid phase. The head groups closely assemble on the material with the tail groups extending away from the material. The self-assembled monolayer can be, for example, an organosilane (e.g. alkyl trichlorosilane, fluorinated alkyl trichlorosilane, alkyl trialkyloxysilane, fluorinated alkyl trialkyloxysilane, etc.).

The precursor compound of the SAM may be present in any conventionally-used organic solvent, inorganic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM.

An example of a commercially available low surface energy SAM is 1H,1H,2H,2H-perfluorodecyltrichlorosilane (also known as, heptadecafluoro-1,1,2,2-tetrahydro-decyl-1-trichlorosilane) [CAS: 78560-44-8], of course, other low surface energy SAM materials could be used. In general the class of fluorinated organosilane derivatives would work as low energy SAM materials. Other examples of commercially available low surface energy SAMs include: trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane.

An example of a commercially available high surface energy SAM is (3-aminopropyl)-trimethoxysilane [CAS: 13822-56-5]. Of course, other high surface energy SAM materials could be used. The general class of organosilanes with amine, alcohol, or mercapto substituents would provide for a high surface energy SAM, relative to the above. Some commercially available examples include: (3-Mercaptopropyl)trimethoxysilane, methyl 11-[dichloro(methyl)silyl]undecanoate, acetoxyethyltrichlorosilane, and vinyltriethoxysilane.

Examples of commercially available oleophilic SAM materials fall within the general class of 1-18 carbon alkylsilanes with a hydrolyzable reactive group (e.g., F, Cl, Br, and I) and alkoxys (e.g., methoxy, ethoxy, and propoxy). Such chemicals are readily available, for example, from Gelest and Sigma Aldrich, and include methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In addition to the alkyl class, other functional SAMs, such as the following, are also are advantageous: 3-aminopropyltrimethoxysilane, methyl 11-[dichloro(methyl)silyl]undecanoate, acetoxyethyltrichlorosilane, vinyltriethoxysilane, and nonafluorohexyltrimethoxysilane.

Various oleophobic SAM materials are commercially available and suitable for use.

Figure 4:
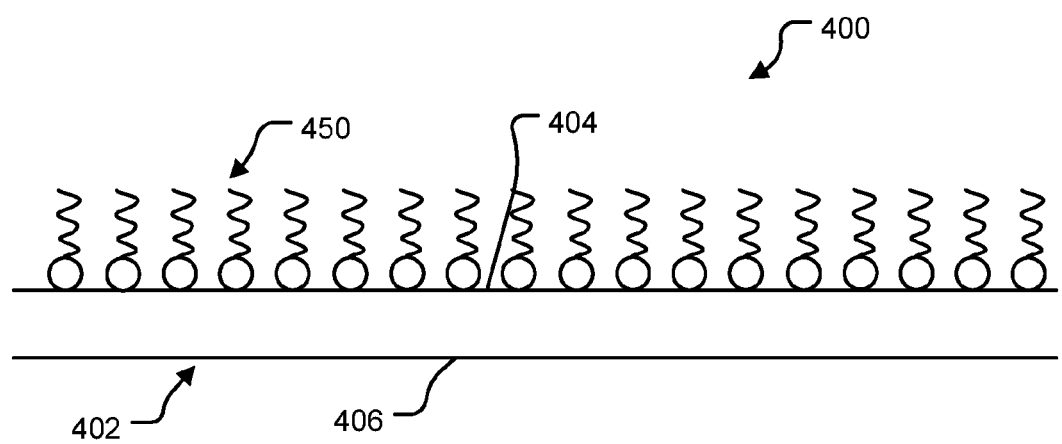
FIG. 4 is a schematic side view of a first example of a cleaning tape.
Figure 5:
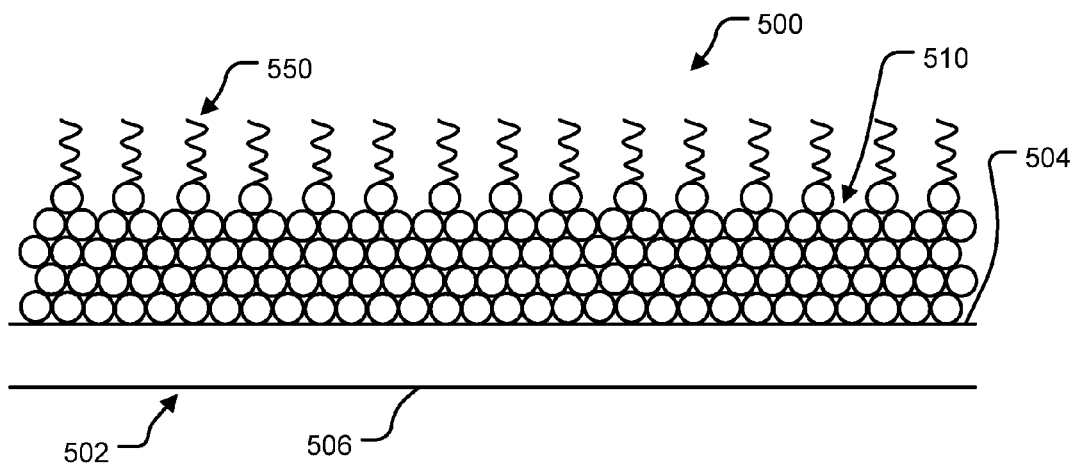
FIG. 5 is a schematic side view of a second example of a cleaning tape.
Figure 6:
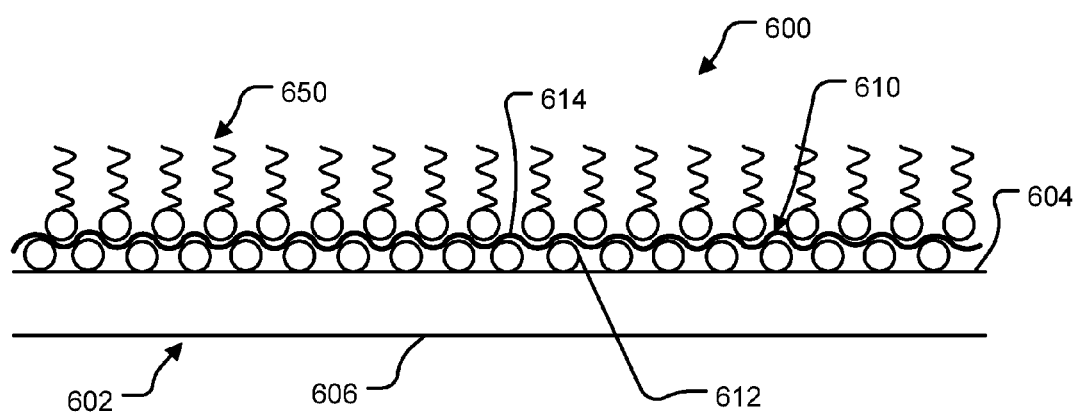
FIG. 6 is a schematic side view of a third example of a cleaning tape.

FIGS. 4 through 6 show examples of suitable tapes for cleaning the media by utilizing a SAM material on the tape.

FIG. 4 shows a cleaning tape 400 having a backing 402 that has a first surface 404 and an opposite second surface 406. Present on the first surface 404 is a SAM material 450. The SAM material 450 may cover the entire first surface 404 or may be present on only a portion of the surface 404. For example, the SAM material 450 may be present as a pattern along the length of the tape 400 or as a pattern across the width of the tape 400. The pattern may have multiple continuous areas having the SAM material 450 and/or have discrete, unconnected areas of the SAM material 450. Multiple SAM materials may be present in any pattern.

The backing 402 is an elongate substrate, typically having a first end and a second end with a great length of material (e.g., at least 1 meter, often at least 10 m) therebetween; the width of the backing 402 is, e.g., 1 cm to 5 cm. Typically, the backing 402 (and leaning tape 400) is wound onto a core or spool, with a first end ready for feeding into an apparatus such as illustrated in FIGS. 2 and 3, however, in some implementations, the backing 402 has its first end connected to its second end to form an endless belt. Materials suitable for the backing 402 include paper or other cellulosic materials, polymeric films (e.g., polyethylene, polyethylene terephthalate (e.g., biaxially-oriented polyethylene terephthalate, aka "Mylar"), polyester, etc.), woven and non-woven fibrous materials, metal foils, foam, and multilayer combinations thereof. The woven and non-woven fibrous materials may include fibers or yarns of cotton, polyester, polyethylene, rayon, silk, nylon, or blends thereof. The thickness of the backing 402 generally ranges from 25 to 200 micrometers, although thinner or thicker backings could be used, depending on the material.

The backing 402 may have a primer or tie coat thereon or have been treated (e.g., corona discharge, UV light exposure, electron beam exposure, flame discharge) to improve coating of the SAM material 450 thereon.

FIG. 5 shows another implementation of a cleaning tape 500 having a backing 502 that has a first surface 504 and an opposite second surface 506. Present on the first surface 504 is a SAM material 550. Unless indicated otherwise, the features of the various elements of the cleaning tape 500 are the same as the same or similar elements of the cleaning tape 400.

In the cleaning tape 500, the SAM material 550 is present on an abrasive coating 510, which is formed by a dense packing of abrasive particles 512 held on the backing 502 by a binder 514. The abrasive coating 510 is known as a "slurry coating," formed by mixing the abrasive particles 512 into a precursor of the binder 514, applying the resulting slurry onto the backing 502, and then curing or drying the precursor to form the binder 514 to obtain the abrasive coating 510.

Suitable abrasive particles 512 include fused aluminum oxide (fused alumina), ceramic aluminum oxide (ceramic alumina), white fused aluminum oxide (white fused alumina), heat-treated aluminum oxide (heat-treated alumina), gamma aluminum oxide (gamma alumina), chrome oxide, silicon carbide, silicon oxide (silica), alumina zirconia, diamond, ceria (cerium oxide), cubic boron nitride (CBN), garnet, and talc.

The abrasive particles 512 have an average particle size of no greater than 10 micrometers, in some implementations no greater than 3 micrometers, in other implementations no greater than 1 micrometer.

The abrasive particles 512 may be any shape, including irregular in shape, blocky, or have a defined shape (e.g., pyramidal, spherical). The term "abrasive particle" also encompasses abrasive agglomerates, i.e., single abrasive particles bonded together, for example with a resinous or ceramic binder.

The abrasive slurry used to form the abrasive composite includes a binder precursor. Examples of possible binder precursors include phenolic resins, aminoplast resins, urethane resins, epoxy resins, ethylenically unsaturated resins, acrylated isocyanurate resins, urea-formaldehyde resins, isocyanurate resins, polyester resins, acrylated urethane resins, acrylated epoxy resins, bismaleimide resins, fluorene modified epoxy resins and mixtures thereof. Depending upon the particular resin, the binder precursor may further include a catalyst or curing agent. The catalyst and/or curing agent will either help initiate and/or accelerate the polymerization process.

The binder precursor is typically in a liquid state or an uncured or non-polymerized state. An example binder precursor is a polyester resin, such as a linear saturated polyester resin.

The abrasive slurry can further comprise optional additives, such as, for example, fillers, lubricants, wetting agents, surfactants, pigments, organic solvents, water, dyes, coupling agents, plasticizers and suspending agents.

FIG. 6 shows another implementation of a cleaning tape 600 having a backing 602 that has a first surface 604 and an opposite second surface 606. Present on the first surface 604 is a SAM material 650. Unless indicated otherwise, the features of the various elements of the cleaning tape 600 are the same as the same or similar elements of the cleaning tape 400 and the cleaning tape 500.

In the cleaning tape 600, the SAM material 650 is present on an abrasive coating 610, which is formed by a monolayer coating of abrasive particles 612 held on to the backing 602 by a binder 614. The abrasive coating 610 is formed by applying a precursor of the binder 614 onto the backing 602 and then applying the abrasive particles 612 onto the precursor and then curing or drying the precursor to form the binder 614 to obtain the abrasive coating 610. In some implementations, a second binder layer may be applied over the abrasive particles 614. In some implementations, such an abrasive coating 610 may be referred to as a "make-size coating."

Figure 7:
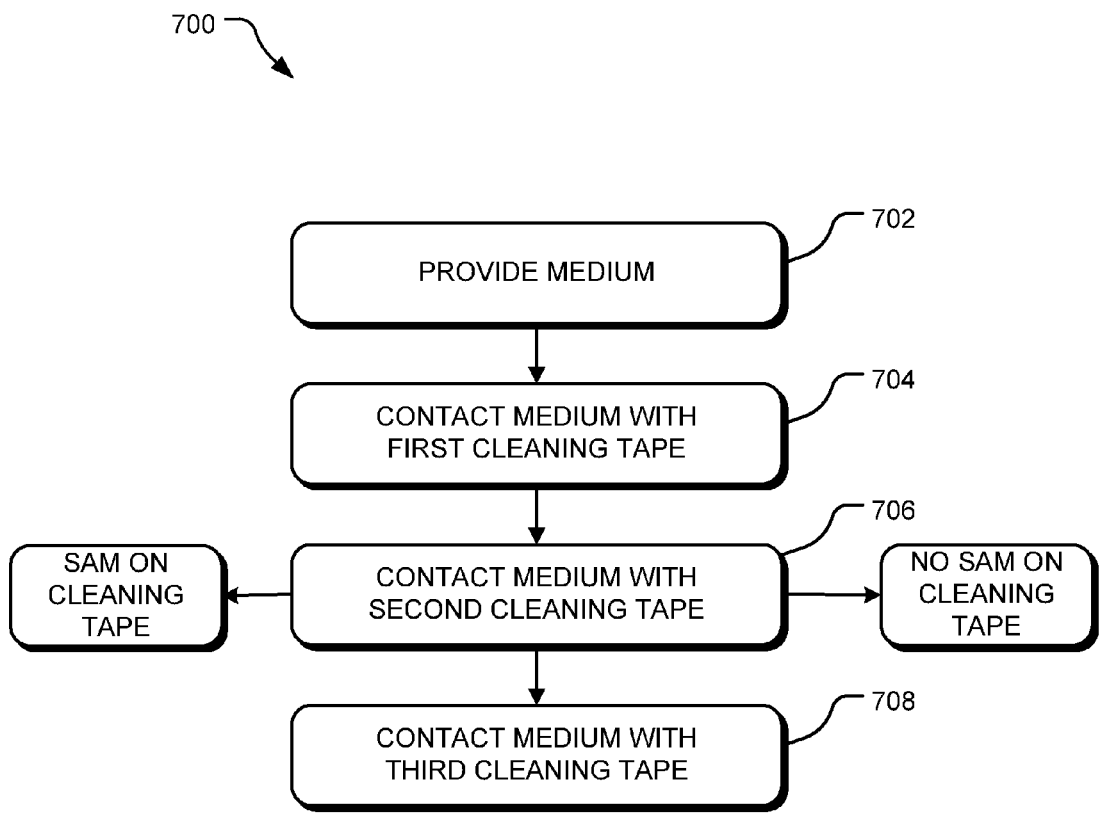
FIG. 7 is a stepwise flow chart showing an example method of cleaning a medium.

In FIG. 7, a method 700 for cleaning a medium with a SAM material on a flexible backing is stepwise illustrated.

In step 702, a medium (e.g., a disc) having a surface to be cleaned is provided. In some implementations, the medium has lubricant already present on the surface.

In a first step 704, a first cleaning tape is brought into contact with the surface. The cleaning tape and the surface are moved in relation to each other; either or both the cleaning tape and the surface may move, either in the same direction or different directions. The first cleaning tape removes particles present on the medium from a magnetic sputtering processes, removes any carbon flakes, and/or removes any loose surface particles. An example of a suitable cleaning tape is the cleaning tape 400 of FIG. 4, having SAM material on a flexible backing.

In a second step 706, a second cleaning tape is brought into contact with the surface. The cleaning tape and the surface are moved in relation to each other; either or both the cleaning tape and the surface may move, either in the same direction or different directions. The second cleaning tape decreases asperity heights on the surface of the medium. In one implementation, an example of a suitable cleaning tape is the cleaning tape 500 of FIG. 5, having SAM material on an abrasive coating on a flexible backing. In an alternate implementation, the second cleaning tape has no SAM material on the abrasive coating.

In a third step 708, which can be a final step, a third cleaning tape is brought into contact with the surface. The cleaning tape and the surface are moved in relation to each other; either or both the cleaning tape and the surface may move, either in the same direction or different directions. The third cleaning tape removes any and all abrasive particles and medium burnish debris from the previous steps 704, 706. An example of a suitable cleaning tape is the cleaning tape 600 of FIG. 6, having SAM material on an abrasive coating on a flexible backing.

After the step 708, no contamination or contaminants remain on the medium surface.

The method 700 may be done simultaneously on two opposite surfaces of the medium, e.g., two opposite surfaces of a disc.

In the method 700 described above, each of the steps 704, 706, 708 utilizes a cleaning tape having a SAM material. In alternate implementations, one or more of the steps may be void of SAM material on the cleaning tape. Additionally, although steps 704, 706, 708 have been called "first," "second" and "third" steps, additional cleaning or other steps may be present between these steps, these additional steps including a SAM material or not. Still further, although three steps 704, 706, 708 have been described, a method may use only one cleaning steps with SAM material on the cleaning tape, or only two cleaning steps with SAM material on the cleaning tapes.

Various implementations for cleaning a medium surface with a cleaning tape having a SAM material have been described above. The above specification provides a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of cleaning a recording medium, comprising: contacting a surface of the recording medium with a flexible tape comprising a flexible backing and a self-assembled monolayer (SAM) coating.

2. The method of claim 1, wherein the method cleans and smooths the surface.

3. The method of claim 1, wherein the method distributes lubricant on the surface.

4. The method of claim 1, wherein the method comprises contacting the surface with a first flexible tape comprising SAM and subsequently contacting the surface with a second flexible tape comprising SAM.

5. The method of claim 4, wherein the first flexible tape and the second flexible tape are different.

6. The method of claim 1, wherein the method comprises contacting the surface with a first flexible tape comprising SAM, then contacting the surface with a second flexible tape void of SAM, and then contacting the surface with a third flexible tape comprising SAM.

7. The method of claim 1, wherein the surface is contacted with a first flexible tape as a second surface opposite the surface is simultaneously contacted with a second flexible tape.

8. The method of claim 7, wherein the first flexible tape and the second flexible tape are the same.

9. A method of cleaning a surface of a recording medium, comprising:
   contacting the surface with a first cleaning tape having a self-assembled monolayer (SAM) coating;
   contacting the surface with a second cleaning tape after contacting with the first cleaning tape; and
   contacting the surface with a third cleaning tape after contacting with the second cleaning tape, the third cleaning tape having a SAM coating.

10. The method of claim 9, wherein the first cleaning tape is void of abrasive.

11. The method of claim 9, wherein the second cleaning tape is void of SAM.

12. The method of claim 9, wherein the second cleaning tape has a SAM coating.

13. The method of claim 9, wherein the second cleaning tape has abrasive.

14. The method of claim 9, wherein the third cleaning tape has abrasive.

15. A method of cleaning a surface of a recording medium, comprising:
   contacting the surface with a first self-assembled monolayer (SAM);
   contacting the surface with an abrasive cleaning tape after contacting with the first SAM; and
   contacting the surface with a second SAM after contacting with the abrasive cleaning tape.

16. The method of claim 15, wherein the abrasive cleaning tape comprises a SAM.

\* \* \* \* \*